DEVICE FOR LIMITING THE POWER LEVEL OF SIGNALS OCCURRING WITHIN AT LEAST ONE PRESELECTED PASSBAND OF A WIDER FREQUENCY BAND

Filed Feb. 15, 1966 2 Sheets-Sheet 1

INVENTORS
WILLIAM M. HONIG
MURRAY SOLOMON
ALLAN CHRISTOPHER
BY Darby & Darby
ATTORNEYS DEVICE FOR LIMITING THE POWER LEVEL OF SIGNALS OCCURRING WITHIN AT LEAST ONE PRESELECTED PASSBAND OF A WIDER FREQUENCY BAND Filed Feb. 15, 1966 2 Sheets-Sheet 2

INVENTORS
WILLIAM M. HONIG
MURRAY SOLOMON
ALLAN CHRISTOPHER
BY Darby & Darby
ATTORNEYS 3,353,119

DEVICE FOR LIMITING THE POWER LEVEL OF SIGNALS OCCURRING WITHIN AT LEAST ONE PRESELECTED PASSBAND OF A WIDER FREQUENCY BAND

William M. Honig, Allan Christopher and Murray Solomon, New York, N.Y., assignors to Loral Corporation, New York, N.Y., a corporation of New York Filed Feb. 15, 1966, Ser. No. 527,420
4 Claims. (Cl. 333—17)

ABSTRACT OF THE DISCLOSURE

A tunable power-limiting device enabling the use of ferrite materials for wideband limiting includes one or more ferrimagnetic filters for respectively separating preselected passbands from the remainder of a wide frequency band, limiter means comprising a ferrimagnetic resonator coupled to the outputs of said separating means for limiting the power level of the signals within said preselected passbands, and means for combining the outputs of the ferrimagnetic limiters with the remaining signals in said wide frequency band.

There is a need for a device capable of limiting the power of RF signals occurring at one or more known frequencies in a wide passband, while passing the remainder of the band without attenuation. For example, undesired pulse type signals (e.g., jamming pulses) may be present in the environment of a radar receiver. Generally, the frequencies of the undesired signals are known, but obviously, such frequencies may not remain the same over extended periods of time or in different environments.

It is not desirable to simply block these signals to counteract their effects. For one reason, the insertion loss of the necessary device into a microwave line introduces undesired mechanical complexities, particularly since the blocking frequencies must be variable. Of equal importance, the permanent insertion of such a device into the circuit would, of necessity, also block any information pulses at the jamming frequencies which are present between pulses.

Accordingly, a more desirable approach to this problem would be to limit the power at the jamming frequencies only during the occurrence of the jamming pulses while passing all other frequencies without attenuation, including information pulses at or near the jamming frequency occurring simultaneously with the jamming pulses.

With this in mind, those skilled in the art have turned to ferrimagnetic limiters to solve the problem. Such limiters have many desirable properties, including the capability of being tuned without movement of any mechanical parts. Also, of substantial importance, there are ferrimagnetic limiters which can individually limit a plurality of signals within the passband of the limiter. For example, consider two simultaneous signals sufficiently close in frequency that they occur in the passband of the limiter. If one of the signals is below the limiting threshold and the other above it, the larger signal will be limited (i.e., reduced to threshold level) but the smaller signal will be passed unaffected.

Unfortunately, this apparent solution is not feasible in many cases because such known limiters have a narrow passband which renders them unsuitable in situations where it is necessary to utilize limiting action over an extended band, e.g., a full octave; accordingly, it is a main object of the present invention to provide a device operable over a wide band of frequencies while utilizing the desirable limiting properties of ferrimagnetic limiters.

Another object of the invention is to provide a limiter device capable of limiting one or more specified frequencies within a wide band without the need for any mechanical tuning devices.

Briefly, in accordance with the invention, the wide band input energy is coupled through a non-reciprocal frequency separating device which separates a narrow band of frequencies from the remainder of the band. This separated frequency band is then coupled through a ferrimagnetic limiter which only limits those signals in the narrow band above a preselected threshold level (e.g., jamming pulses). The limiter output is then recombined with the remainder of the band appearing at the other output of the frequency separator so that no useful information is lost. According to the invention, it is possible to limit in as many narrow bands as desired.

The manner in which the above and other objects of the invention are accomplished is more fully described below with reference to the attached drawings, wherein.

Figure 1A:
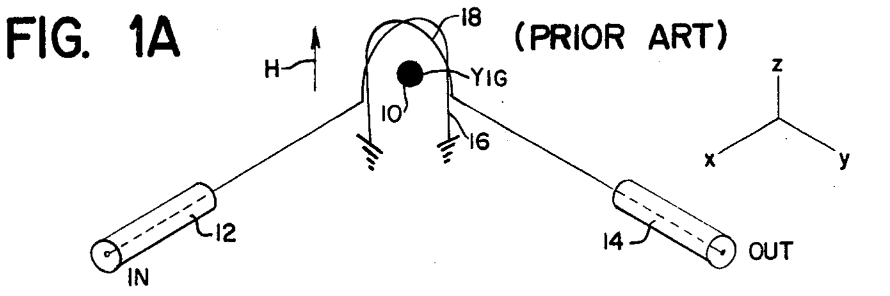
FIG. 1A (PRIOR ART)
FIGURE 1A illustrates a typical ferrimagnetic limiter which may be used with the invention.

Referring to FIGURE 1A, there is illustrated a known form of a ferrimagnetic limiter which comprises a sphere 10 made, for example, of yttrium iron garnet (YIG) and is coupled to orthogonal transmission lines 12 and 14 by wire loops 16 and 18, respectively. The YIG sphere 10 is placed in a static magnetic field H and, in accordance with known theory, will have a resonant frequency in megacycles equal to approximately 2.8H, where H is measured in gauss.

The operating principles of ferrimagnetic resonators are well known and will not be considered in detail. Basically, operation depends upon the existence of a magnetic moment in each molecule of a crystal of ferrimagnetic electrically insulating material. This moment may be aligned with an externally applied quasi-static magnetic field (H). If an alternating magnetic field is simultaneously applied orthogonally to the static field (e.g., by loop 16), the magnetic moment will precess around the static field at a rate determined by the fundamental constants of the material and the magnitude of the static field. A resultant magnetic field is produced transverse to both the static field H and the input magnetic field. Accordingly, an orthogonal output (e.g., line 18) can be arranged to couple to this resultant magnetic field. A complete theoretical discussion of YIG limiters may be found in an article by George H. Thiess in Microwaves, September 1964 (page 14, et seq.).

As the input power increases the precession angle also increases toward a fixed maximum (about 3°), at which point one kind of limiting occurs. When limiting occurs, YIG sphere 10 appears as a ferrimagnetic resonator only for the power below the limiting level; the rest of the power sees a short circuit and is reflected thereby. Energy outside of the passband of the limiter is reflected by the short since the resonator does not interact with it.

Figure 1B:
FIGURE 1B illustrates the circuit representation of the limiter used in the subsequent description.
Figure 1C:
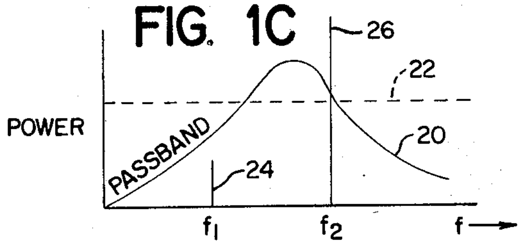
FIGURE 1C is an explanatory diagram.

The limiting characteristic of this structure is unlike that of a common limiter since the limiter can simultaneously limit one signal while passing a second signal within the passband without attenuation. Thus, referring to FIGURE 1C the passband of a typical limiter is illustrated at 20. The threshold of the limiter is shown by the dashed line 22 and two input signals 24 and 26 occurring at frequencies $f1$ and $f2$ within the limiter passband may be considered to have been applied simultaneously to the limiter input. Unlike diode limiters and the like, a ferrimagnetic limiter will reduce the power level of signal $f2$ to the threshold level at 22 while passing signal $f1$ without limiting. In the following description the symbol shown in FIGURE 1B is used to represent a ferrimagnetic limiter of the type described with reference to FIGURE 1A.

As previously mentioned, YIG limiters of the type described are narrow band devices with passbands ranging between 10 mc. and 200 mc. In numerous cases this passband is insufficient; for example, a typical radar receiver may have bands of 500, 1000 and 2000 megacycles. In such a situation the limiter above described would have no utility. However, according to the present invention, means are provided to enable utilization of the desirable properties of such ferrimagnetic limiters.

As explained in detail below, the invention separates the narrower passbands in which it is desired to limit the power from the full passband appearing at the receiver. For this purpose, a frequency separating device of the type shown in FIGURE 2A is used.

Figure 2A:
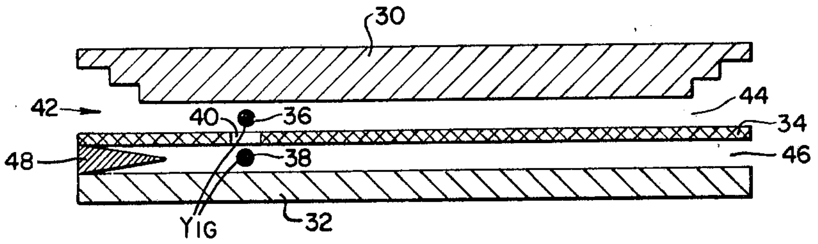
FIG. 2A (PRIOR ART)
FIGURE 2A is a side sectional view of a four-port non-reciprocal frequency separating device which may be used in accordance with the invention.

FIGURE 2A illustrates a four-port nonreciprocal waveguide filter. The filter comprises outer waveguide conductors 30 and 32 separated by an interior wall 34. Two YIG spheres 36 and 38 are mounted within the waveguide adjacent an iris or coupling aperture 40.

The input energy is coupled into the filter at port 42. For all frequencies in the passband other than the resonant frequency of sphere 36, the spheres have an extremely low permeability and therefore do not affect the flow of energy. This off frequency energy therefore flows directly from port 42 to output port 44. However, the energy at the resonant frequency of sphere 36 "sees" an extremely large permeability; this resonant energy is therefore coupled through iris 40 to sphere 38 (resonant at the same frequency as sphere 36). Sphere 38 serves a switching function and couples this resonant energy out of port 46. A matched load 48 is inserted opposite port 46 so that energy reflected from the termination at the end of port 46 will be absorbed. The device is non-reciprocal in the sense that none of such reflected energy can reach input port 42 or output port 44. Alternatively, the reflected energy may be blocked by the use of a conventional isolator.

Figure 2B:
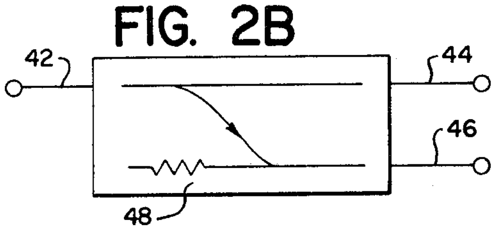
FIGURE 2B is a circuit representation of the frequency separator of FIGURE 2A.

Instead of using two separate spheres 36 and 38, a single sphere may be located in a thin wall and thereby serve the same function. A circuit representation of the frequency separator is shown in FIG. 2B with the corresponding parts identically numbered.

Figures 3A, 3B:
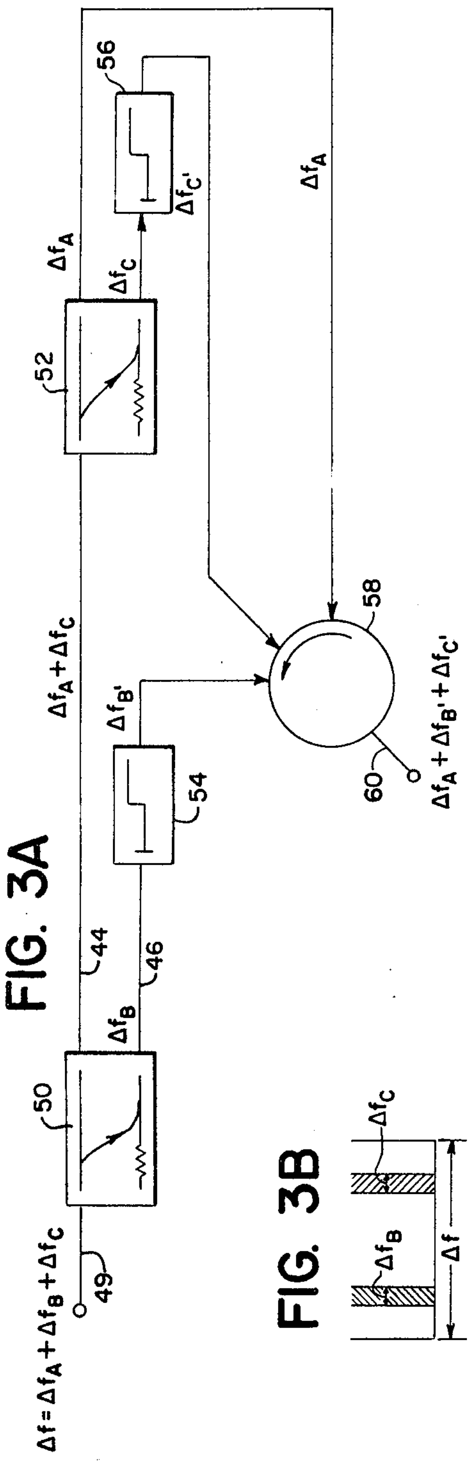
FIGURE 3A is a block diagram of a preferred embodiment of the invention showing two tunable limiting ranges.
FIGURE 3B is an explanatory diagram.

A block diagram of the invention is shown in FIGURE 3A. The full band of frequencies received appears on line 49. As shown in FIGURE 3B, the passband is represented by $\Delta f$ and includes two narrow bands $\Delta f_B$ and $\Delta f_C$. The remainder of the band is considered $\Delta f_A$.

Assume it is desired to limit signals occurring in the bands $\Delta f_B$ and $\Delta f_C$. Accordingly, the composite signal on line 49 is coupled to a first frequency separator 50 which produces $\Delta f_A$ plus $\Delta f_C$ at the upper port 44, and $\Delta f_B$ at the lower port 46. $\Delta f_B$ is fed to a limiter 54 which operates as described above with reference to FIGURE 1A, producing on its output a limited signal $\Delta f_B$.

The upper output 44 of separator 50 is fed to a second separator 52 which passes $\Delta f_A$ and $\Delta f_C$ to its upper and lower ports, respectively. $\Delta f_C$ in turn is coupled to a second limiter 56 which produces the limited output $\Delta f_{C'}$. The outputs of the limiters 54 and 56 together with the unlimited output $\Delta f_A$ from separator 52 are coupled to a circulator 58 which, in a known fashion, combines the three inputs thereto and produces at its output the sum of $\Delta f_A$, $\Delta f_{B'}$, and $\Delta f_{C'}$.

In this fashion any two narrow bands (in the illustrated embodiment) within the total band $\Delta f$ may be segregated for the purpose of limiting signals which appear therein. By the nature of the ferrite limiters, only the undesirable signals will be limited with the intelligence being passed without any attenuation. Of course, the invention is not limited to any particular range of frequencies and the principles explained above could be expanded to tune the device for three, four or more separate ranges. The separators 50 and 52 and the limiters 54 and 56 may be tuned by simply varying the applied magnetic field (which may be electro-magnetic) thereby adjusting the resonant frequency of the YIG spheres as described above with reference to FIGURES 1A and 2A.

Figure 4:
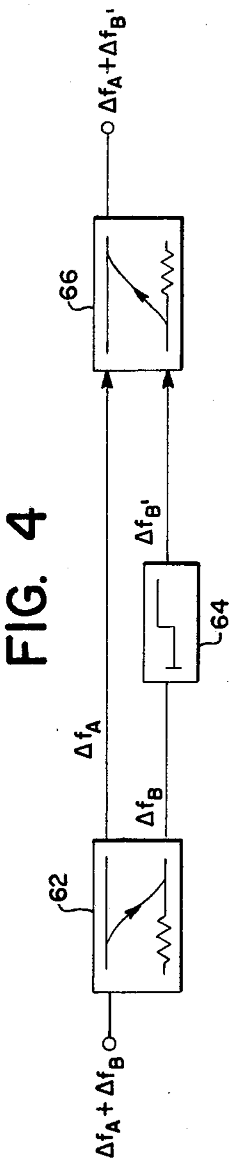
FIGURE 4 is a block diagram of a second embodiment of the invention having one tunable limiter range.

FIGURE 4 is an alternative embodiment of the invention showing a single tunable limiter range and avoiding the use of the circulator 58. With reference to FIGURE 4, the total passband is considered to comprise bands $\Delta f_A$ and $\Delta f_B$ which are fed to a first frequency separator 62 which separates the two bands and applies the band $\Delta f_B$ to a limiter 64. The limiter 64 output $\Delta f_{B'}$ and the band $\Delta f_A$ from the separator 62 are coupled to a frequency combining apparatus 66 which combines $\Delta f_A$ and $\Delta f_{B'}$ into a single output as desired. Frequency combiner 66 is substantially the same as the separator shown in FIGURE 2A with the input signals coupled to ports 44 and 46 and the output taken from port 42.

The only design problem likely to be encountered is in phasing certain limited and non-limited signals which are to be combined. Thus, at the half-power points of a narrow band, $\Delta f_B$, half of the power couples through the separator and out of port 46 with the other half emerging from port 44. When these particular signals are to be subsequently recombined there will be some signal cancellation to the extent that the signals are out of phase. To prevent this undesired effect, a conventional isolator may be inserted in the unlimited separator output 44 to block the out of phase signals. Alternatively, any conventional phase compensator may be inserted into the line. For example, considering the inherent phase shift due to the YIG spheres (ninety degrees), the total length of the microwave lines may be carefully adjusted so that the reflected signals from the unlimited output 44 of the frequency separator will combine in phase with the output from separator port 46 after limiting.

It will be obvious to those skilled in the art that the invention is not limited to particular components, and that the principles of the invention are equally applicable to coaxial and stripline circuits. In place of the frequency separator illustrated in FIGURE 2A, a conventional circulator may be used to separate the desired narrow passband from the remainder of the band. Thus, the narrow band would be taken as an output from an input circulator and passed through a non-limiting filter of conventional form to the type of limiter illustrated in FIG. 1A. The remainder of the original band may be taken from another output of the input circulator and coupled to an output circulator together with the limiter output. Such a device has been constructed using YIG for the limiter and GAYIG as the material of the non-limiting filter. Both devices were located under the same magnet, and to avoid the phase difficulties mentioned above, a conventional line stretcher was inserted between the limiter and non-limiting filter. Once the phase was properly adjusted, the device was electronically tunable over the entire S band region, and limited at the −20 dbm level between 3400 mc. and 2000 mc. The bandwidth of the limited signals was approximately 30 mc.

What is claimed is:

1. A device for limiting the power level of signals occuring within at least one preselected passband of a wider frequency band, said passband being intermediate the low and high extremes of said wider frequency band, comprising non-reciprocal means for separating the signals within said preselected passband from the remaining signals within said wider band, limiter means comprising a ferrimagnetic resonator coupled to said separating means for limiting the power of the signals within said preselected passband to a threshold level, and means for combining the output of said limiter means with said remaining signals.

2. A device according to claim 1, wherein said means for separating comprises a ferrite material.

3. A device according to claim 1, wherein said means for separating comprises a filter including means for absorbing reflected energy within said preselected passband.

4. A device according to claim 2, wherein there is provided additional means responsive to said remaining signals for separating the signals within a second passband from the signals outside both said preselected passbands, and additional limiter means coupled to said additional separating means and comprising a ferrimagnetic resonator for limiting the power level of the signals within said second passband to a threshold level, said combining means combining the outputs of both said limiter means with said signals outside both said preselected passbands.

References Cited

UNITED STATES PATENTS 3,278,866 10/1966 Bose ............... 333—17

HERMAN KARL SAALBACH, *Primary Examiner.*

P. L. GENSLER, *Assistant Examiner.*